United States Patent
Momochi et al.

[11] Patent Number: 6,099,216
[45] Date of Patent: Aug. 8, 2000

[54] PROFILE PROCESSING METHOD AND PROCESSING MACHINE THEREFOR

[75] Inventors: Takeshi Momochi, Numazu; Masahito Shiozaki, Niigata; Makoto Sagara, Mishima, all of Japan

[73] Assignee: Toshiba Kikai Kabushiki Kaisha, Tokyo, Japan

[21] Appl. No.: 09/195,916

[22] Filed: Nov. 19, 1998

[30] Foreign Application Priority Data

Nov. 20, 1997 [JP] Japan ................................. 9-319586

[51] Int. Cl.⁷ ........................................ B23C 9/00
[52] U.S. Cl. ........................... 409/132; 409/80; 409/191
[58] Field of Search ................................. 409/131, 132, 409/80, 190, 191, 199; 451/49, 57

[56] References Cited

U.S. PATENT DOCUMENTS

| | | | |
|---|---|---|---|
| 3,752,596 | 8/1973 | Weyand et al. | 408/234 |
| 4,016,855 | 4/1977 | Mimata | 451/41 |
| 4,259,940 | 4/1981 | Asano et al. | 451/435 |
| 4,268,999 | 5/1981 | Noto et al. | 451/6 |
| 4,569,326 | 2/1986 | Tanizaki et al. | 451/450 |
| 4,621,407 | 11/1986 | Suzuki | 408/35 |
| 4,632,615 | 12/1986 | Yamamura | 409/235 |
| 4,850,761 | 7/1989 | Breuer et al. | 409/132 |
| 4,869,626 | 9/1989 | Kosmowski | 408/129 |
| 5,078,558 | 1/1992 | Arai et al. | 409/233 |
| 5,108,236 | 4/1992 | Arai et al. | 409/163 |
| 5,125,775 | 6/1992 | Breuer et al. | 409/132 |
| 5,378,091 | 1/1995 | Nakamura | 409/132 |
| 5,688,084 | 11/1997 | Fritz et al. | 409/202 |

*Primary Examiner*—Steven C. Bishop
*Attorney, Agent, or Firm*—Finnegan, Henderson, Farabow, Garrett & Dunner, L.L.P.

[57] ABSTRACT

A profile processing method and a processing machine therefor which can obtain a good finish surface accuracy in all the carving surfaces and curb the decrease in tool's life are provided.

More specifically, an end mill is first moved along an outermost side of an annular groove in carving the annular groove to a work. Consequently, the end mill is gradually moved to inside to be moved and carve along the annular groove. When the outermost side of the annular groove is carved, the movement path of the end mill is selected so that the outermost side is down-cut (counterclockwise in FIG. 5). When further inner side is carved, the movement path of the end mill is selected so that the direction of the relative movement path is opposite to the direction of the relative movement path when the outermost side is carved, in other words, the carved surfaces are down-cut by the end mill.

8 Claims, 8 Drawing Sheets

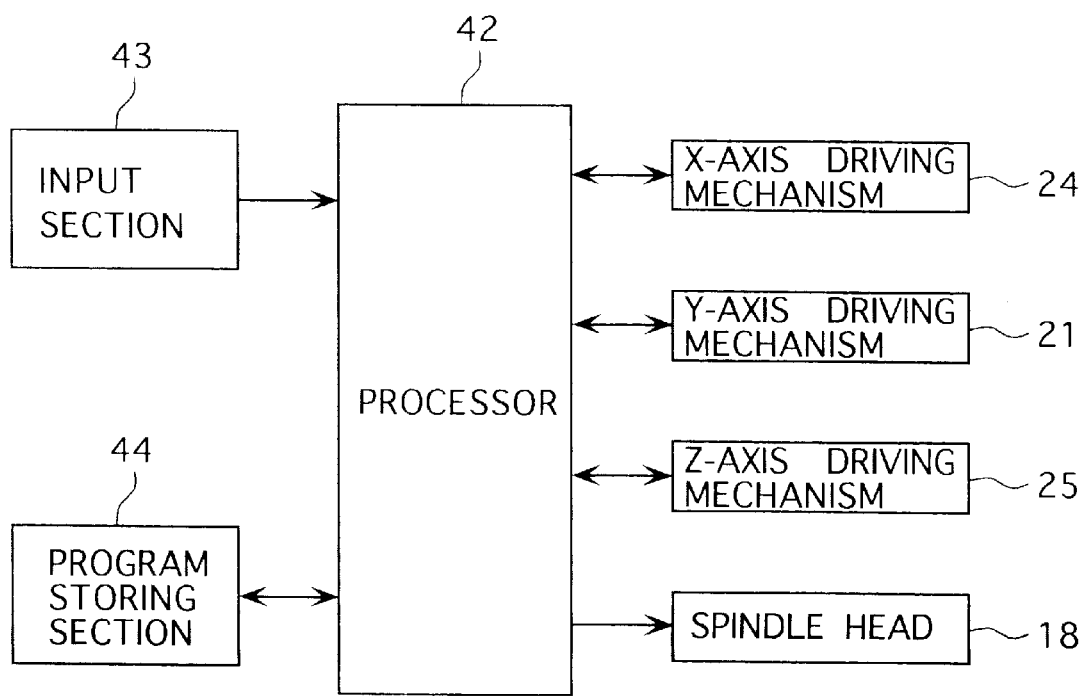
F I G. 3

F I G. 5
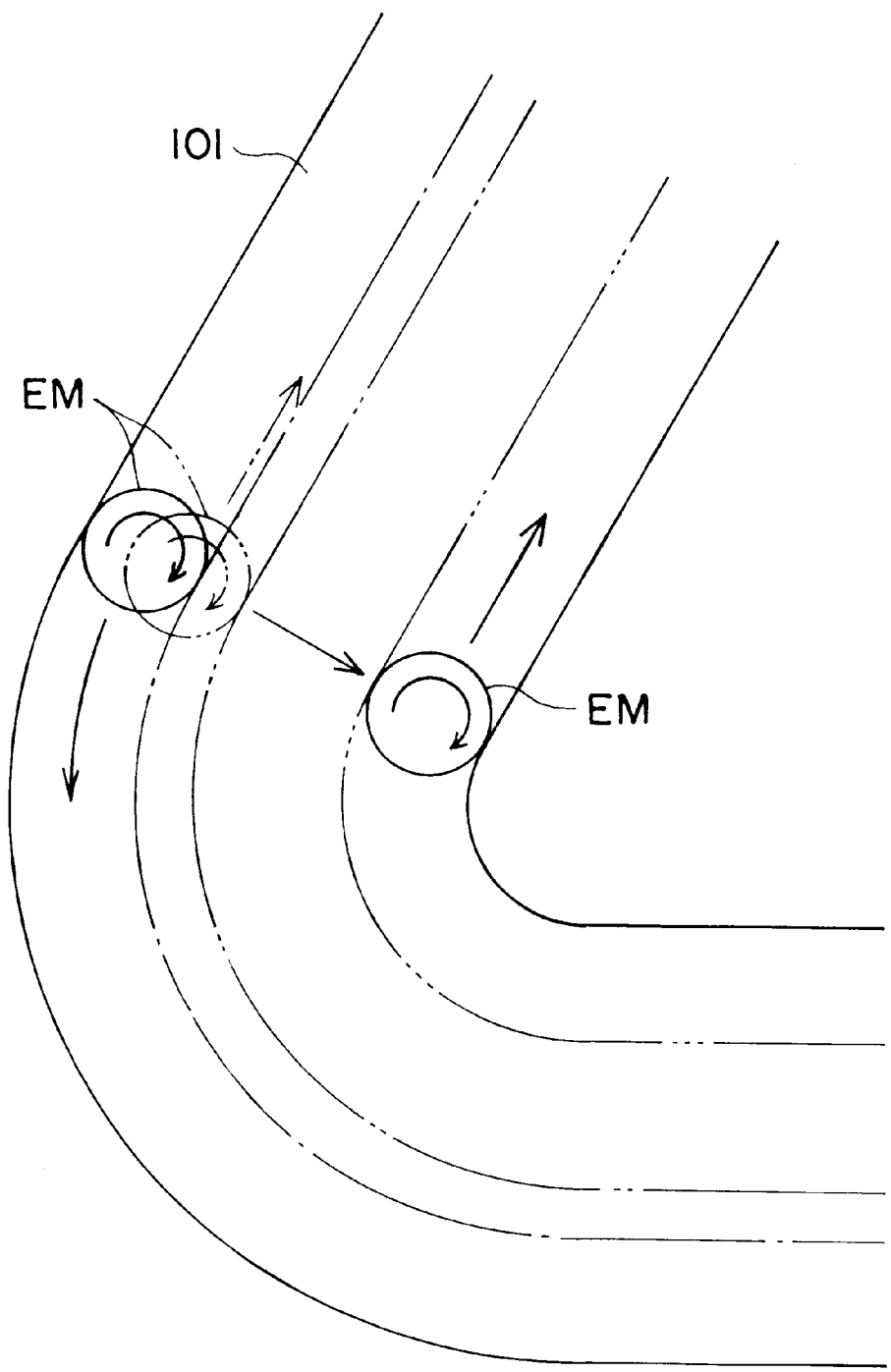

PROFILE PROCESSING METHOD AND PROCESSING MACHINE THEREFOR

BACKGROUND OF THE INVENTION

1. Field of the Invention

The present invention relates to a profile processing method for processing a concave or a convex profile to a work using a rotary tool and a processing machine therefor. For example, the present invention relates to a profile processing method for processing a predetermined concave or convex profile onto a mold material using an end mill and a processing machine therefor.

2. Description of Related Art

Conventionally, when a concave portion, an annular groove for example, is carved onto a work using a rotary tool such as an end mill, the innermost part of the annular groove is first carved and other part is further carved by moving the end mill gradually from inside to outside.

For instance, when an annular groove 101 shown in FIGS. 7(A) and 7(B) carved, the end mill EM is initially moved along the inner side of the annular groove 101 for carving. Consequently, the end mill EM is moved outwardly in a width direction of the annular groove 101 at a predetermined amount, and the annular groove 101 is further carved from the position by moving the end mill EM along the annular groove 101. Accordingly, the profile is carved by moving the end mill EM gradually outwardly and repeating similar movement.

[Problem in Cutting Condition]

However, according to the conventional carving method, an up-cut (cutting upwardly) and a down-cut (cutting downwardly) exist in a work together. More specifically, in FIG. 7, the annular groove 101 is down-cut (cutting downwardly) relative to the inner surface of the annular groove 101 when the end mill EM is moved along the inner side of the annular groove 101, however, the annular groove 101 is up-cut (cutting upwardly) when the outer side is carved. Therefore, it is difficult to obtain good finish surface accuracy in all of carved surfaces, and the life span of the tool is shortened.

Generally speaking, since a swarf thickness in conducting the up-cut (cutting upwardly) starts from zero and increases gradually as shown in FIG. 8(A), it is not possible to cut when the swarf thickness is zero because of the absence of the room for an edge to be cut into the work. Accordingly, the edge rubs a surface carved by the previous edge when the work is started to be up-cut.

On the other hand, since a swarf thickness in conducting the down-cut (cutting downwardly) is the greatest at the beginning of cutting and is decreased gradually, a force for separating the edge from the work is generated when the swarf thickness is zero.

Therefore, the up-cutting (cutting upwardly) is shorter in tool's life and is more likely to cause grinding burn than the down-cut (cutting downwardly). So, when the up-cut (cutting upwardly) and the down-cut (cutting downwardly) coexist in a work as in a conventional carving method, it is difficult to obtain good finish surface accuracy in all of the carving surfaces and the tool's life is shortened.

[Problem in Moving Direction]

Further, since the end mill EM is always moved from inside toward outside for carving concave portion in a conventional method, a contact area of the end mill EM relative to the work is widened as the end mill EM is moved outwardly thereby increasing the load applied on the tool. Therefore, the tool's life is further shortened.

[Object]

The object of the present invention is to solve aforesaid problems, that is, to provide a profile processing method and processing machine therefor which can obtain a good finish surface accuracy in all the carving surfaces and curb the decrease in tool's life.

SUMMARY OF THE INVENTION

The profile processing method according to the present invention is for carving a profile of concave portion or convex portion onto a work using a rotary tool. The profile processing method according to the present invention is characterized in that a relative movement. path between the rotary tool and the work is selected so that the work is always down-cut by the rotary tool when the work is processed.

Preferably, the rotary tool and the work are relatively movable in three-dimensional directions (X, Y and Z direction orthogonal with each other). The rotary tool is, for instance, an end mill and a milling cutter and the like. The relative movement path refers to a path including a relative movement direction of the rotary tool and the work.

Since the relative movement path of the rotary tool and the work is selected so that the work is always down-cut by the rotary tool, a good finish surface accuracy can be obtained in all the carving surfaces and the decrease in tool's life span can be considerably curbed as compared to a conventional method where the up-cut (cutting upwardly) and the down-cut (cutting downwardly) are coexisted.

[Processing Concave Portion]

In the above, when the profile of the concave portion is carved to the work, it is preferable that the rotary tool and the work is relatively moved to carve the work so that the rotary tool is gradually moved from an outermost side of the concave portion to an inner side. When the outermost side is carved the relative movement path of the rotary tool and the work is preferably selected so that the outermost side of the concave portion is always down-cut. And when the rotary tool and the work is relatively moved to carve the concave portion from the outermost side to the inner side, the relative movement path of the rotary tool and the work is preferably selected so that the relative movement path is opposite to the relative movement path for carving the outermost side of the concave portion.

Accordingly, since the rotary tool is gradually moved to carve the concave portion from the outermost side to the inner side, an increase of the processing load imposed on the rotary tool, which is a conventional disadvantage in moving the rotary tool from the inner side to the outer side, can be decreased. Therefore, decrease in tool's life can be further curbed as well as obtaining a good finish surface accuracy of all the carving surfaces.

[Processing Convex Portion]

When a profile of the convex portion is carved to the work, it is preferable that the rotary tool and the work is relatively moved to carve the work so that the rotary tool is gradually moved from an outermost side of the convex portion to a further outer side. Preferably, the relative movement path of the rotary tool and the work is selected so that the outermost side of the convex portion is always down-cut when the outermost side is carved, and the relative movement path of the rotary tool and the work is selected so that the relative movement path is opposite to the relative movement path for carving the outermost side of the convex portion when the rotary tool and the work is relatively moved to carve the convex portion from the outermost side to the further outer side.

According to the above, a good finish surface accuracy of all the carved surfaces can be obtained and curbing decrease in the tool's life can be expected in processing the profile of the convex portion.

[Cutting Outermost Surface]

In the above, the cutting of the outermost side of the depth of the concave portion or the height of the convex portion is preferably divided in a plurality of times only in carving the outermost portion of the concave portion and the convex portion.

Accordingly, the processing load imposed in carving the outermost portions can be decreased, thereby curbing the decrease in the tool's life.

[Processing Machine]

The processing machine according to the present invention has a machine body and a controller for controlling a drive of the machine body, the machine body having a table for a work to be set onto and a spindle head having a rotary tool, in which the table and the spindle head is relatively movable in a three-dimensional direction. The processing machine is characterized in that the controller has a selector for selecting a relative movement path of the table and the spindle head so that the work is always down-cut by the rotary tool when a concave or a convex profile is carved on the work.

Aforesaid advantage of the profile processing method, that is obtaining a good finish surface accuracy of all the carving surfaces and curbing the decrease in the tool's life span can be attained in the above configuration. Furthermore, since the relative movement path of the rotary tool and the work is automatically selected so that the work is always down-cut by the rotary tool, efficient processing is possible.

The controller may be a conventional processor of a NC device. The processor preferably has a program storing section for storing a processing program including a process to the work and a driving mechanism for relatively moving the table and the spindle head, and the processor preferably employs a software which selects the relative movement path so that the work is always down-cut by the rotary tool in accordance with the program set and stored in the program storing section in advance.

BRIEF DESCRIPTION OF THE DRAWINGS

FIG. 3 is a block diagram showing a NC device and a driving mechanism according to the aforesaid embodiment;

FIG. 5 is an enlarged view of a part of the FIG. 4;

DETAILED DESCRIPTION OF THE PREFERRED EMBODIMENT(S)

A preferred embodiment according to the present invention will be described below with reference to the attached drawings.

Figure 1:
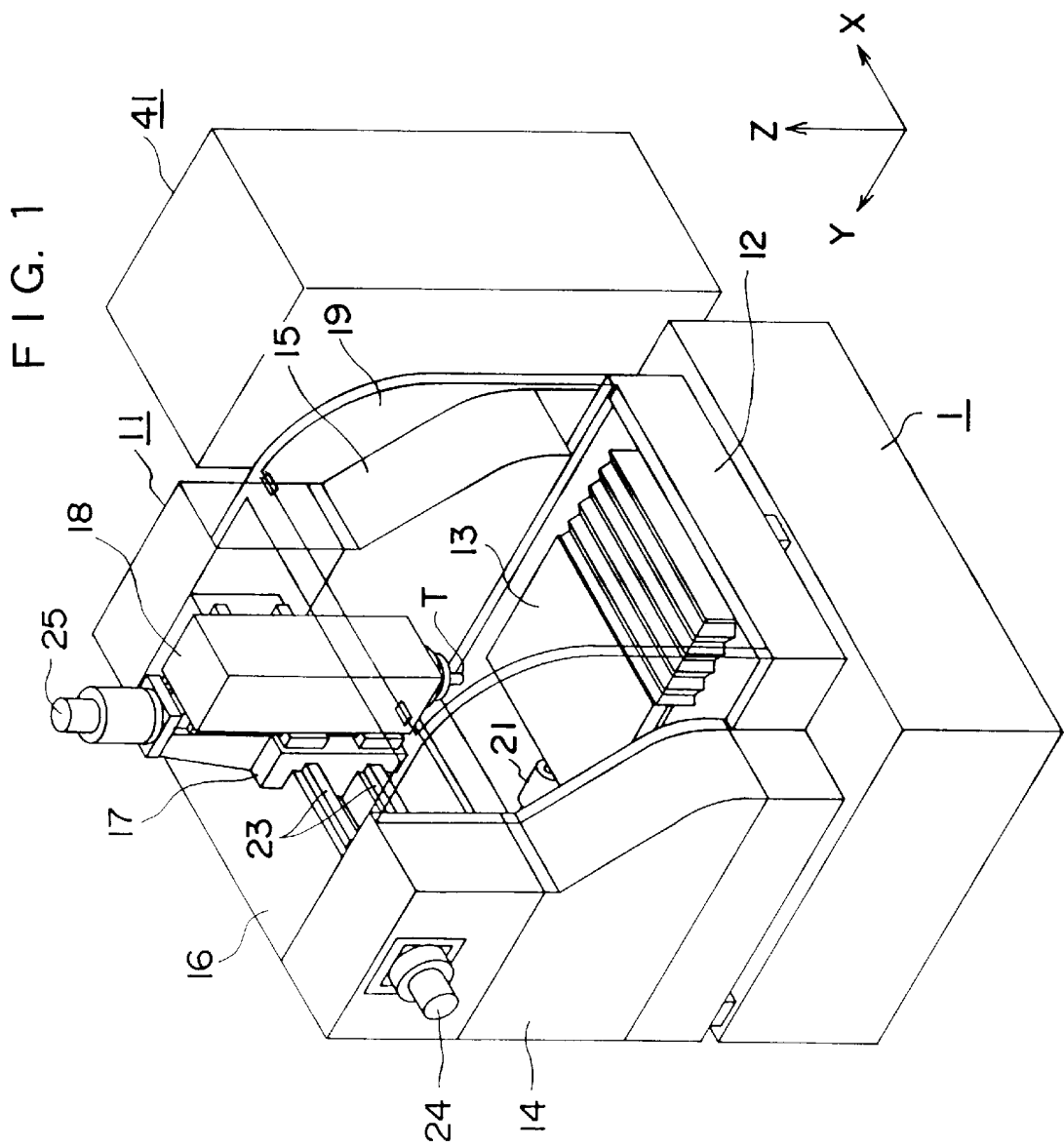
FIG. 1 is a perspective view showing a preferred embodiment of a processing machine according to the present invention.

FIG. 1 is a perspective view showing a processing machine on which a profile processing method according to the present invention is applied. As shown in FIG. 1, the processing machine according to the present embodiment is a machine tool controlled by a NC device, and has a base 1, a machine body 11 mounted on the base 1 and a NC device 41 as a controller for controlling the drive of the machine body 11.

[Machine Body]

The machine body 11 is composed of a bed 12 mounted on the upper side of the base 1 through a leveler or the like, a table 13 provided on an upper side of the bed 12 movably in back and forth direction (Y-axis direction), a pair of column 14 and 15 erectly set on both side of the bed 12, a cross rail 16 stretched between upper portions of the columns 14 and 15, a slider 17 provided along the cross rail 16 movably in right and left direction (X-axis direction), a spindle head 18 provided elevatably in up and down direction (Z-axis direction), and a splash guard 19 which covers a front part between the column 14 and 15, of which inside is visible and which can be opened and closed in up and down direction with the upper end thereof as a fulcrum.

The bed 12 has a Y-axis driving mechanism 21 which moves the table 13 in Y-axis direction accompanied by a guide (not shown) for guiding the table 13. A feed screw mechanism consisting of a motor and a feed screw shaft rotated by the motor is employed as the Y-axis driving mechanism 21.

The side shape of the respective columns 14 and 15 is configured approximately triangle having wider bottom portion than upper portion. Accordingly, the bottom portion is stable enough to decrease a vibration generation even when a high-speed rotating spindle head 18 is used.

The cross rail 16 has two guide rail, 23 for movably guiding the slider 17 as well as X-axis driving mechanism 24 for moving the slider 17 in X-axis direction.

The slider 17 has a guide (not shown) for guiding the spindle head 18 in Z-axis direction as well as a Z-axis driving mechanism 25 for elevating the spindle head in Z-axis direction. As in the Y-axis driving mechanism 21, the driving mechanisms 24 and 25 also employ a feed screw mechanism composed of a motor and a feed screw shaft rotated by the motor.

[Spindle Head]

Figure 2:
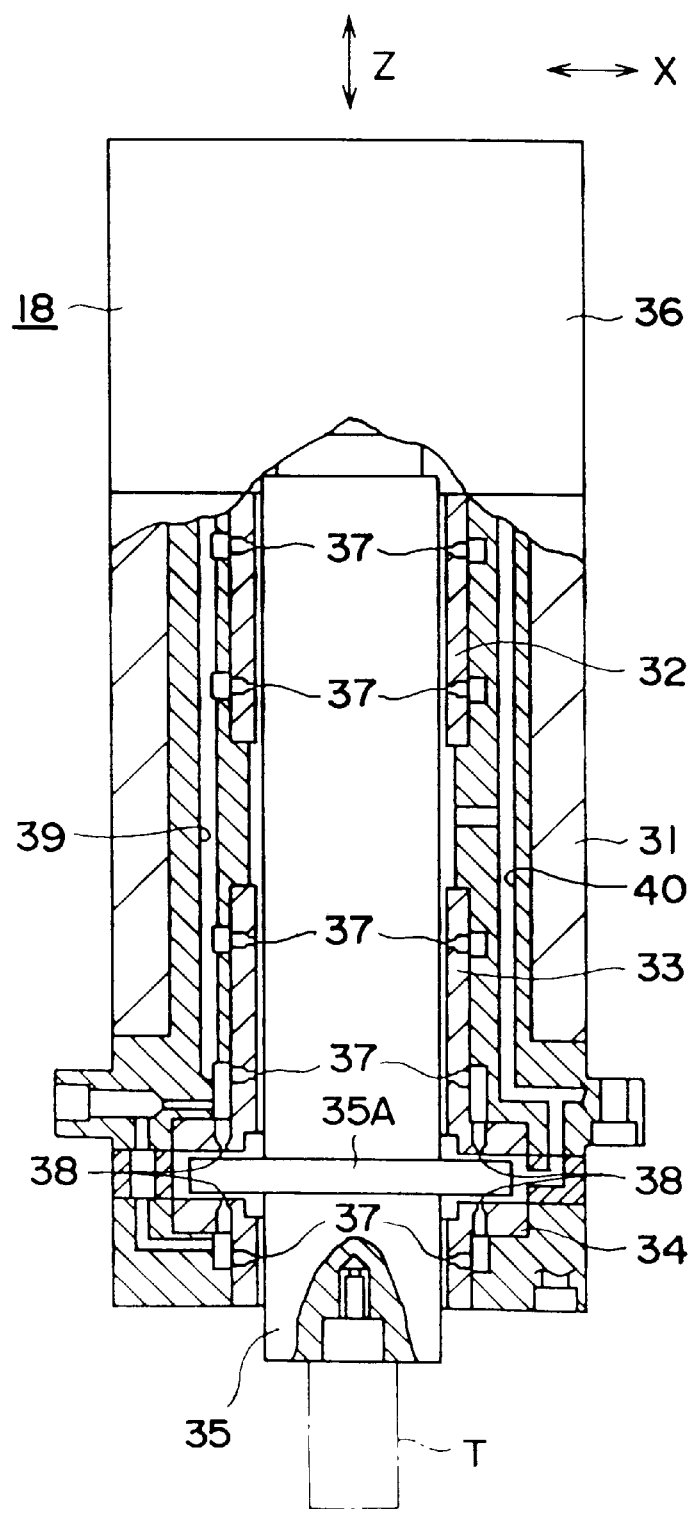
FIG. 2 is a cross-section of a spindle head according to the aforesaid embodiment.

As shown in FIG. 2, the spindle head 18 is composed of an air-bearing supported spindle head. More specifically, the spindle head 18 is composed of an air-bearing supported spindle head having a housing 31 elevatably provided to the cross rail 16 elevated by the Z-axis driving mechanism 25, a spindle 35 supported in parallel to Z-axis direction to the housing 31 rotatably through the air-bearings 32, 33 and 34 and having a fringe 35A in the halfway thereof, and a motor 36 for rotatively driving the spindle 35. The spindle 35 can be rotated at a high-speed of 30,000 to 50,000 rpm.

A plurality of air-blowing holes 37 which blow air toward the spindle 35 in a direction perpendicular to the axis of the spindle are formed on an inner side of the respective air-bearings 32, 33 and 34. The air blown by the air-blowing holes 37 forms a radial bearing for supporting the spindle 35 in a radial direction. Another plurality of air-blowing holes 38 which blow air toward the fringe 35A of the spindle 35 are formed on an end side of the respective air-bearings 33 and 34 respectively opposing in axis-direction. The air blown by the air-blowing holes 38 forms a thrust bearing for supporting the spindle 35 in a thrust direction. Incidentally, in FIG. 2, 39 is an air-supply passage for providing air to the respective air-blowing holes 37 and 38, 40 is an air-outlet passage and T is a rotary tool such as an end mill.

[Controller]

As shown in FIG. 3, the NC device has a processor 42. To the processor 42, an input section 43 and a program storing section 44 for storing a program input through the input section 43 is connected as well as the driving mechanisms 21, 24 and 25 and the spindle head 18. The processor 42 has a selector for selecting a relative movement path of the rotary tool T and a work so that the work is always down-cut by the rotary tool T in processing a profile of a concave portion and a convex portion onto the work in accordance with a program set and stored to the program storing section 44 in advance. In other words, the processor 42 has a driver for driving the X, Y and Z-axis driving mechanisms so that the work is always down-cut.

The selector for selecting the relative movement path may be software or the like installed in the processor 42. As to specific steps, the selector first determines in which direction the work should be up-cut or down-cut in respective processing path based on a information such as a direction of an edge of the rotary tool T, processing direction set on the processing program and processing path. Consequently, a direction in which the work is down-cut is selected. After selecting the direction in which the work is always down-cut in the respective movement path, the program may be re-constructed so that the respective processing path should be effectively continued.

[Effect]

Figure 6:
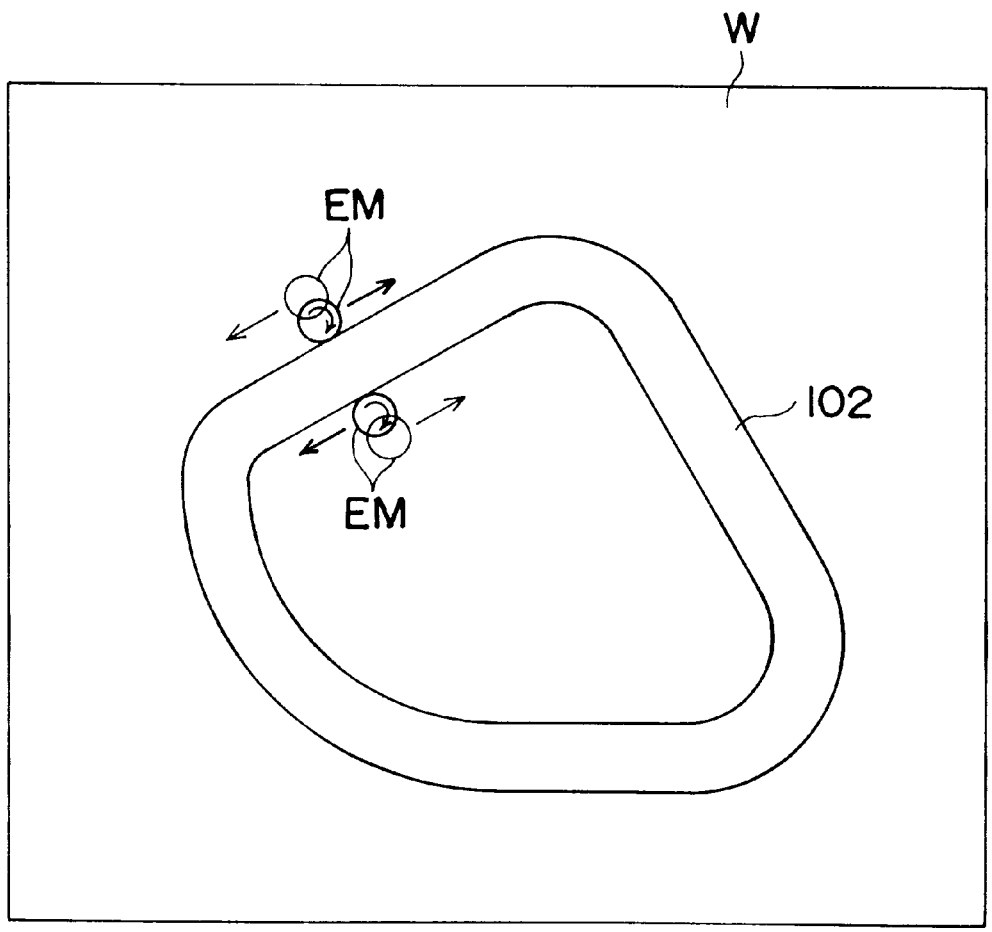
FIGS. 6(A) and 6(B) are illustrations showing a movement path of a tool in carving an annular convex tread in the aforesaid embodiment.
Figure 6:
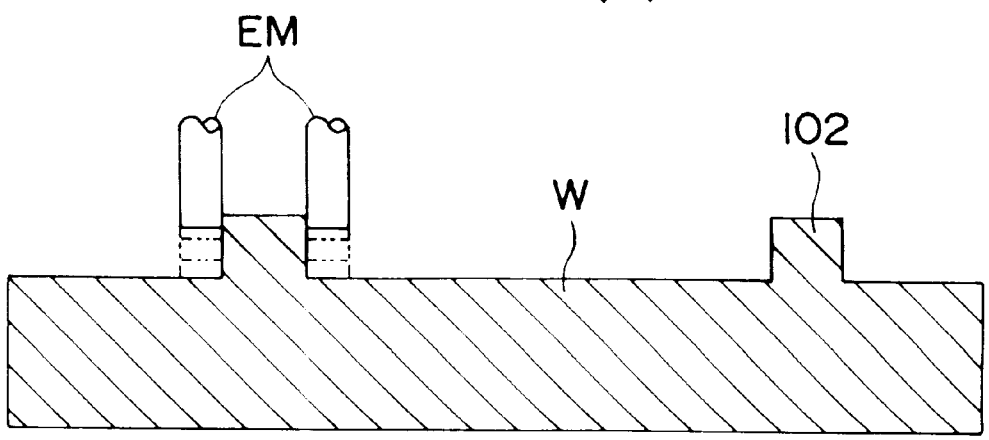
Figure 7:
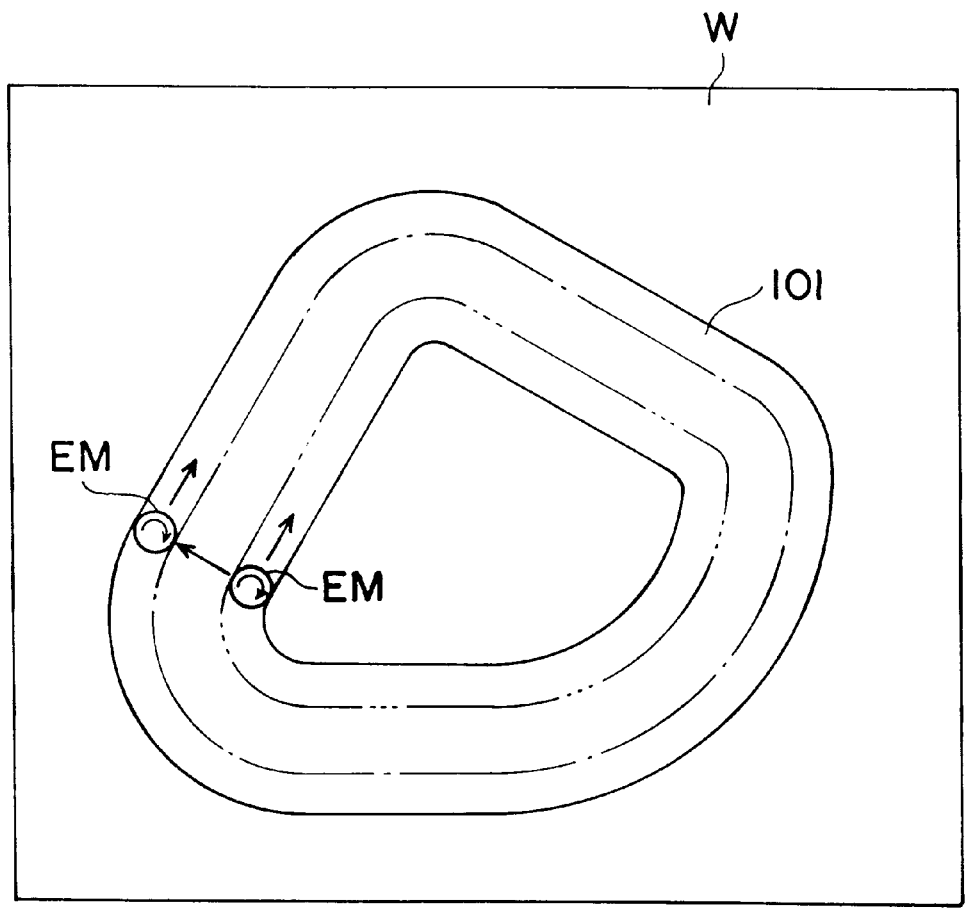
FIGS. 7(A) and 7(B) are illustrations showing a movement path of a tool in carving an annular groove in a conventional processing method.
Figure 7:
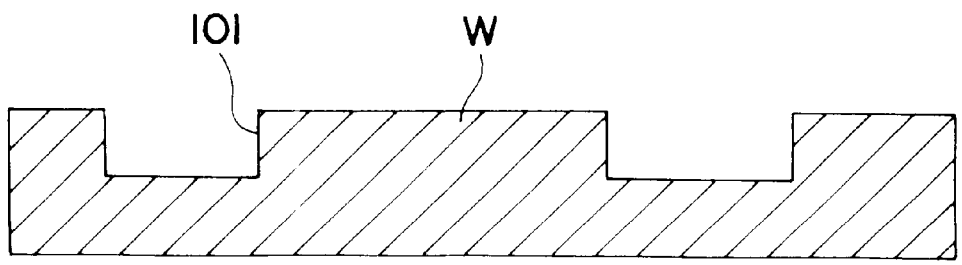

The effect of the present embodiment will be described below with reference to FIG. 4 to 6.

The work is carved by the rotary tool T attached to the spindle 35 while the table 13 and the spindle head 18 is relatively moved in X, Y and Z-axis direction by a command from the NC device 41. More specifically, the table 13 is moved in Y-axis direction by the Y-axis driving mechanism and the spindle head 18 is moved in X and Z-axis direction by the X-axis driving mechanism 24 and the Z-axis driving mechanism 25 when the rotary tool T attached to the spindle 35 carves the work.

[Carving Concave Portion]

Firstly, the rotary tool, the end mill EM here, is relatively moved along the outermost path of the annular groove 101 when the annular groove 101 shown in FIG. 4(A)(B) is carved.

Figure 8:
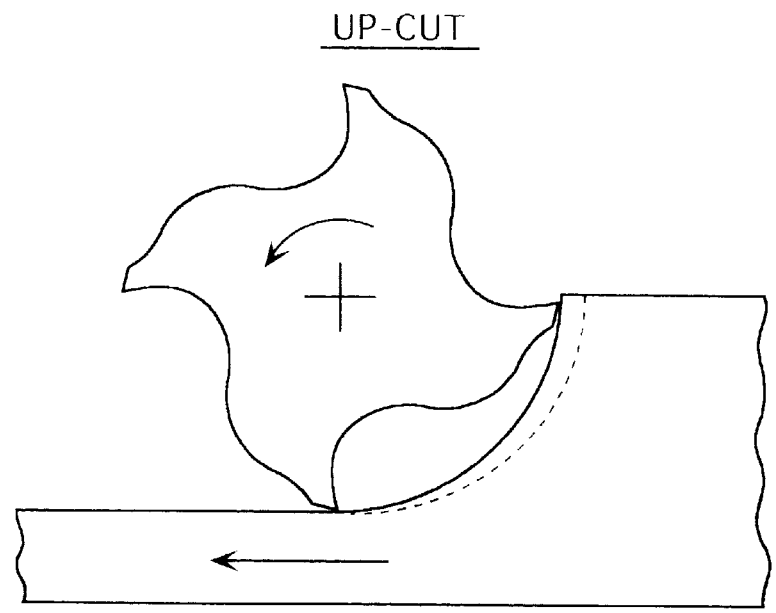
FIG. 8(A) is an illustration of up-cut.
FIG. 8(B) is an illustration of down-cut.
Figure 8:
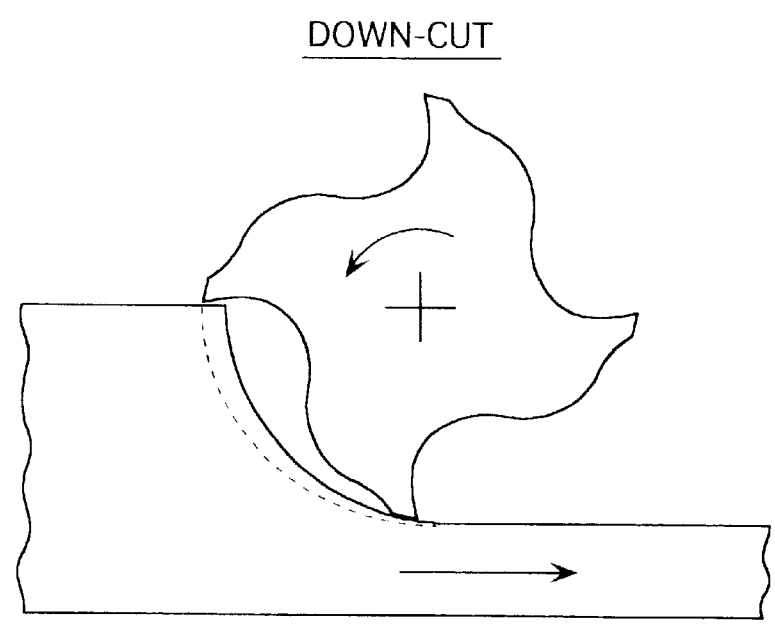

If the rotating direction of the end mill EM is clockwise in FIG. 4(A), the relative movement path of the end mill EM and the work W is set counterclockwise. Accordingly, the outermost side of the annular groove 101 is carved in down-cut shown in FIG. 8(B). The cutting amount of the end mill EM in Z-axis direction is set as a fraction of depth D, and the end mill EM is moved on the same path in a plurality of times with the same cutting amount to carve depth D.

Consequently, as shown in enlarged view of FIG. 5, after the end mill EM is moved at a predetermined amount inwardly in width direction of the annular groove 101, the end mill EM is relatively moved against the work W oppositely to previous movement (relative movement path of the outermost side). That is, the end mill EM is relatively moved clockwise along the annular groove 101. Accordingly, the carved surface (a surface shown in double dotted line in FIG. 5) is carved in down-cut shown in FIG. 8(B). At this time, the cutting amount of the end mill EM in Z-axis direction stays depth D of the annular groove 101 and only the inwardly cutting amount of the annular groove 101 in the width direction is carved.

The work is gradually carved inwardly while the end mill EM is relatively moved clockwise along the annular groove 101. The same movement is repeated until the end mill EM reaches the innermost path of the annular groove 101. Accordingly, all the processing surfaces are carved in down-cut thereby obtaining good finish surface accuracy in all of the carved surfaces and curbing the decrease in the tool's life span.

[Carving Convex Portion]

When the annular convex tread 102 shown in FIG. 6(A)(B) is carved, following steps are taken.

Figure 4:
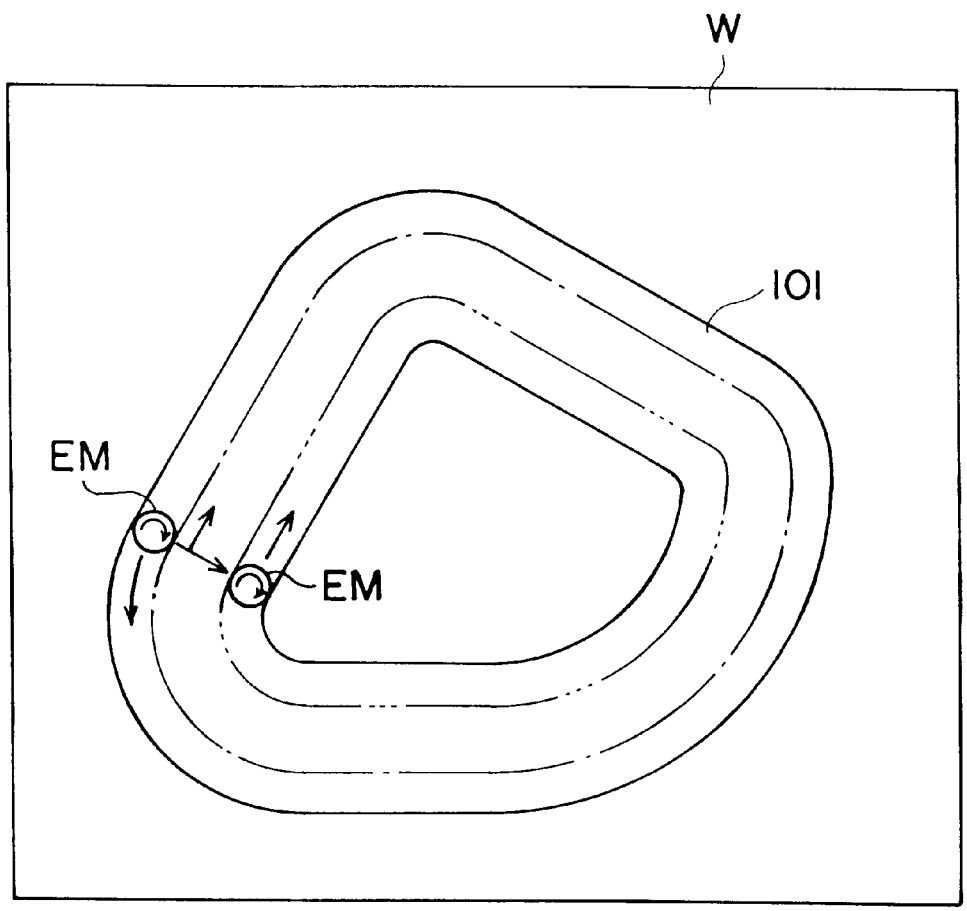
FIGS. 4(A) and 4(B) are illustrations showing a movement path of a tool in carving an annular groove in the aforesaid embodiment.
Figure 4:
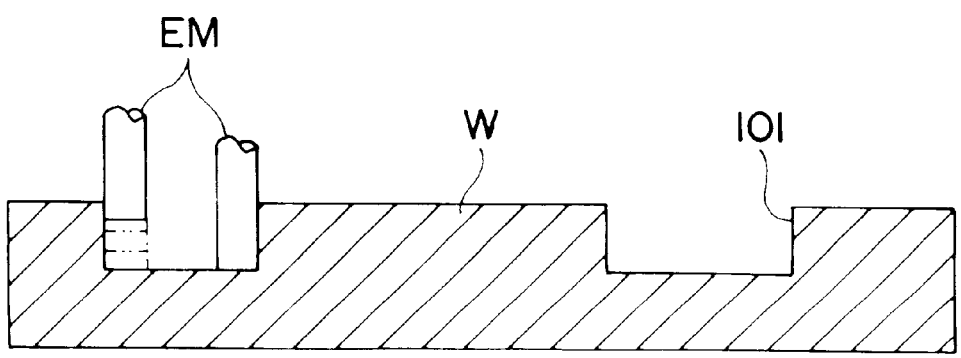

Firstly, when the inner side to the annular convex tread 102 is carved, all the carved surfaces can be down-cut in accordance with the method shown in FIG. 4 and 5.

On the other hand, when the outer side to the annular convex tread 102 is carved, the end mill EM is relatively moved clockwise along the outermost path of the annular convex tread 102. Accordingly, the outermost side of the annular convex tread 102 is down-cut.

Consequently, after relatively moving the end mill EM outwardly at a predetermined amount against the annular convex tread 102, the end mill EM is relatively moved oppositely to the previous movement (the relative movement path of the outermost side), i.e. counterclockwise. Accordingly, outer carved surface of the annular convex tread 102 is carved in down-cut.

Incidentally, the cutting of the annular convex tread 102 is divided in a plurality of times only when the outermost side of the annular convex tread 102 is carved.

[Effect]

According to the present embodiment, the end mill EM is gradually moved inwardly from the outermost side of the annular groove 101 when the profile of the annular groove 101 is carved on the work W. And the relative movement path is selected so that the outermost side of the annular groove 101 is down-cut when the outermost side is carved, and relative movement path opposite to the previous relative movement path of the outermost side is selected when further inner side is carved. Accordingly, a good surface accuracy for all carving surfaces can be obtained and decrease in the tool's life span can be curbed.

Particularly, since the end mill EM is relatively moved from the outermost side to inside of the annular groove 101, an increase in the load applied on the end mill, which is a problem in conventional processing of moving the end mill from inside to outside, can be decreased. Accordingly, the decrease in the tool's life span can be curbed.

When the profile of the annular convex tread 102 is carved on the work W, the end mill EM is gradually moved from the outermost side of the annular convex tread 102 to inside. And the relative movement path of the end mill EM and the work W is selected so that the outermost side of the annular convex tread 102 is down-cut when the outermost side is carved, and the relative movement path opposite to the previous relative movement path of the outermost side is selected when the further outer side is carved. Accordingly, a good surface accuracy for all carving surfaces can be obtained and decrease in the tool's life span can be curbed as in the annular groove 101, when the profile of the annular convex tread is carved.

Since the cutting of the depth of the annular groove 101 and the height of the annular convex tread 102 are divided in a plurality of times only when the outermost side is carved, the load applied to the end mill EM can be decreased in carving, thereby further curbing the decrease in the tool's life span.

Further, since the spindle head 18 is the air-bearing spindle head which rotatably supports the spindle 35 by the air-bearings 32, 33 and 34 thereby obtaining high-speed rotation with high-accuracy of the air-bearing spindle head, the process can be efficiently conducted with a great cutting feed speed.

[Modifications]

Incidentally, the spindle head 18 is movable in X and Z-axis direction and the table is movable in Y-axis direction in the above-described embodiment, however, any structure can be adopted as long as the rotary tool T and the work W can be relatively moved in three-dimensional directions (X, Y and Z-axis direction).

Further, the spindle head 18 of the above-described embodiment is an air-bearing spindle head which rotatably supports a spindle with air-bearings, however, the scope of the present invention is not limited to the embodiment, and a spindle head which rotatably supports a spindle with a ball bearing or the like can also be adopted.

What is claimed is:

1. A method for carving a concave profile having an outermost side in a work by using a rotary cutting tool, the method comprising the steps of:

moving at least one of the rotary tool and the work such that the rotary tool moves inwardly from the outermost side of the concave profile;

moving at least one of the rotary tool and the work in a path such that the rotary tool down-cuts the outermost side of the concave profile; and moving at least one of the rotary tool and the work in a path in the opposite direction to the path for down-cutting the outermost side of the concave profile as the rotary tool moves relative to the work from the outermost side inwardly and down-cuts the work.

2. The method according to claim 1, wherein the outermost side of the concave portion is carved by a plurality of cutting stages in a depth direction.

3. A method for carving a convex profile having an outermost side in a work by using a rotary cutting tool, the method comprising the steps of:

moving at least one of the rotary tool and the work such that the rotary tool moves outwardly from the outermost side of the convex profile;

moving at least one of the rotary tool and the work in a path such that the rotary tool down-cuts the outermost side of the convex profile; and moving at least one of the rotary tool and the work in a path in the opposite direction to the path for down-cutting the outermost side of the convex profile as the rotary tool moves relative to the work from the outermost side outwardly and down-cuts the work.

4. The method according to claim 3, wherein the outermost side of the convex portion is carved by a plurality of cutting stages in a height direction.

5. The method according to claim 3, further comprising the steps of:

moving at least one of the rotary tool and the work such that the rotary tool moves inwardly from an innermost side of the convex profile;

moving at least one of the rotary tool and the work in a path such that the rotary tool down-cuts the innermost side of the convex profile; and moving at least one of the rotary tool and the work in a path in the opposite direction to the path for down-cutting the innermost side of the convex profile as the rotary tool moves inwardly from the innermost side.

6. A processing machine for carving a concave profile having an outermost side in a work, comprising:

a machine body having a table for securing a work and a spindle head having a rotary tool movable relative to the table in three-dimensional directions; and a controller for controlling the machine body, the controller having a selector for selecting a relative movement path of the table and the spindle head so that the spindle head moves inwardly from the outermost side of the concave profile and the work is always down-cut by the rotary tool.

7. A processing machine for carving a convex profile having an outermost side in a work, comprising:

a machine body having a table for securing a work and a spindle head having a rotary tool movable relative to the table in three-dimensional directions; and a controller for controlling the machine body, the controller having a selector for selecting a relative movement path of the table and the spindle head so that the spindle head moves outwardly from the outermost side of the convex profile and the work is always down-cut by the rotary tool.

8. The processing machine according to one of claims 6 and 7, wherein the controller is a processor of a NC device;

wherein the processor has a program storing section for storing a processing program including a process to the work and a driving mechanism for relatively moving the table and the spindle head; and wherein the processor selects the relative movement path so that the work is always down-cut by the rotary tool in accordance with the program set and stored in the program storing section in advance.

* * * * *